(12) United States Patent
Sameshima et al.

(10) Patent No.: US 7,584,121 B1
(45) Date of Patent: Sep. 1, 2009

(54) OBJECT SUBJECT TO PROCESSING, WHICH JUDGES NEED FOR PREDETERMINED PROCESSING THEREOF BASED ON USAGE AND SPECIFICATION THEREOF

(75) Inventors: Shigetoshi Sameshima, Machida (JP); Katsumi Kawano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/644,059

(22) Filed: Aug. 23, 2000

(30) Foreign Application Priority Data

Nov. 12, 1999 (JP) .................................. 11-322116

(51) Int. Cl.
*G06Q 40/00* (2006.01)
(52) U.S. Cl. .......................................... 705/26; 705/35
(58) Field of Classification Search ...................... 705/1, 705/8, 26, 35; 700/113; 707/10; 714/6; 455/466

See application file for complete search history.

(56) References Cited

U.S. PATENT DOCUMENTS

| | | | | | |
|---|---|---|---|---|---|
| 5,056,028 | A | * | 10/1991 | Ohta et al. | 364/468 |
| 5,088,045 | A | * | 2/1992 | Shimanaka et al. | 364/468 |
| 5,091,849 | A | * | 2/1992 | Davis et al. | 364/200 |
| 5,119,318 | A | * | 6/1992 | Paradies et al. | 395/61 |
| 5,150,288 | A | * | 9/1992 | Imai et al. | 364/132 |
| 5,231,271 | A | * | 7/1993 | Hino et al. | 235/385 |
| 5,295,242 | A | * | 3/1994 | Mashruwala et al. | 395/133 |
| 5,579,231 | A | * | 11/1996 | Sudou et al. | 364/468.01 |
| 5,655,118 | A | * | 8/1997 | Heindel et al. | 395/614 |
| 5,732,074 | A | * | 3/1998 | Spaur et al. | 370/313 |
| 5,761,063 | A | * | 6/1998 | Jannette et al. | 364/468.03 |
| 5,825,981 | A | * | 10/1998 | Matsuda | 395/83 |
| 5,848,394 | A | * | 12/1998 | D'Arrigo et al. | 705/8 |
| 5,896,292 | A | * | 4/1999 | Hosaka et al. | 364/468.15 |

(Continued)

FOREIGN PATENT DOCUMENTS

JP 2-67645 3/1990

(Continued)

OTHER PUBLICATIONS

J. Rumbaugh, M Blaha, W. Premerlani, F. Eddy, and W. Lorensen. Object-Orientated Modeling and Design, 1991, Prentis-Ha inside front cover and inside back cover.*

(Continued)

*Primary Examiner*—Thu Thao Havan
(74) *Attorney, Agent, or Firm*—Brundidge & Stanger, P.C.

(57) ABSTRACT

An object of the present invention is to enable simplifying the information management with respect to the product including the production, distribution, operation and recycle to allow effective production, operation and recycle in accordance with the situation. In order to achieve the object, the present invention provides an apparatus for each of products or parts constituting the products, the apparatus has a memory for storing the information with respect to the attribute and situation of the product and parts. The situation is updated based on thus obtained information from a sensor or communication process by a process for recognizing an object's situation. This situation is shared with other products address parts as well as other equipment through the communication process, and allowing recognition by a process for recognizing an object's situation, warning to outside, or performing processing by cooperating with suitable other equipment or apparatuses.

13 Claims, 11 Drawing Sheets

U.S. PATENT DOCUMENTS 6,154,658 A * 11/2000 Caci .......................... 455/466

FOREIGN PATENT DOCUMENTS

| JP | 6-106464 | 4/1994 |
|---|---|---|
| JP | 7-146887 | 6/1995 |
| JP | 7-160325 | 6/1995 |
| JP | 10-700 | 1/1998 |

OTHER PUBLICATIONS

W. Stevenson, Production/Operations Management. 1993.Richard D. Iriwin, Inc. p. 6,7.*

"ID System and Examples of its Application" Factory Automation, Feb. 1995, pp. 51-57.

* cited by examiner

FIG. 3

| | | |
|---|---|---|
| PRODUCT IDENTIFIER | | ~311 |
| POSITION | | ~312 |
| PRODUCT SPECIFICATION | | ~313 |
| ORDERED PERSON | | ~314 |
| DATE OF DELIVERY | | ~315 |
| PROCESS DATE | | ~316 |
| PROCESSING DEADLINE | | ~317 |
| ⋮ | | |

| PRODUCT IDENTIFIER | | 611 |
| --- | --- | --- |
| PRODUCT SPECIFICATION | | 612 |
| USING DISTANCE | | 613 |
| TRAVELING DISTANCE | | 614 |
| ⋮ | | |

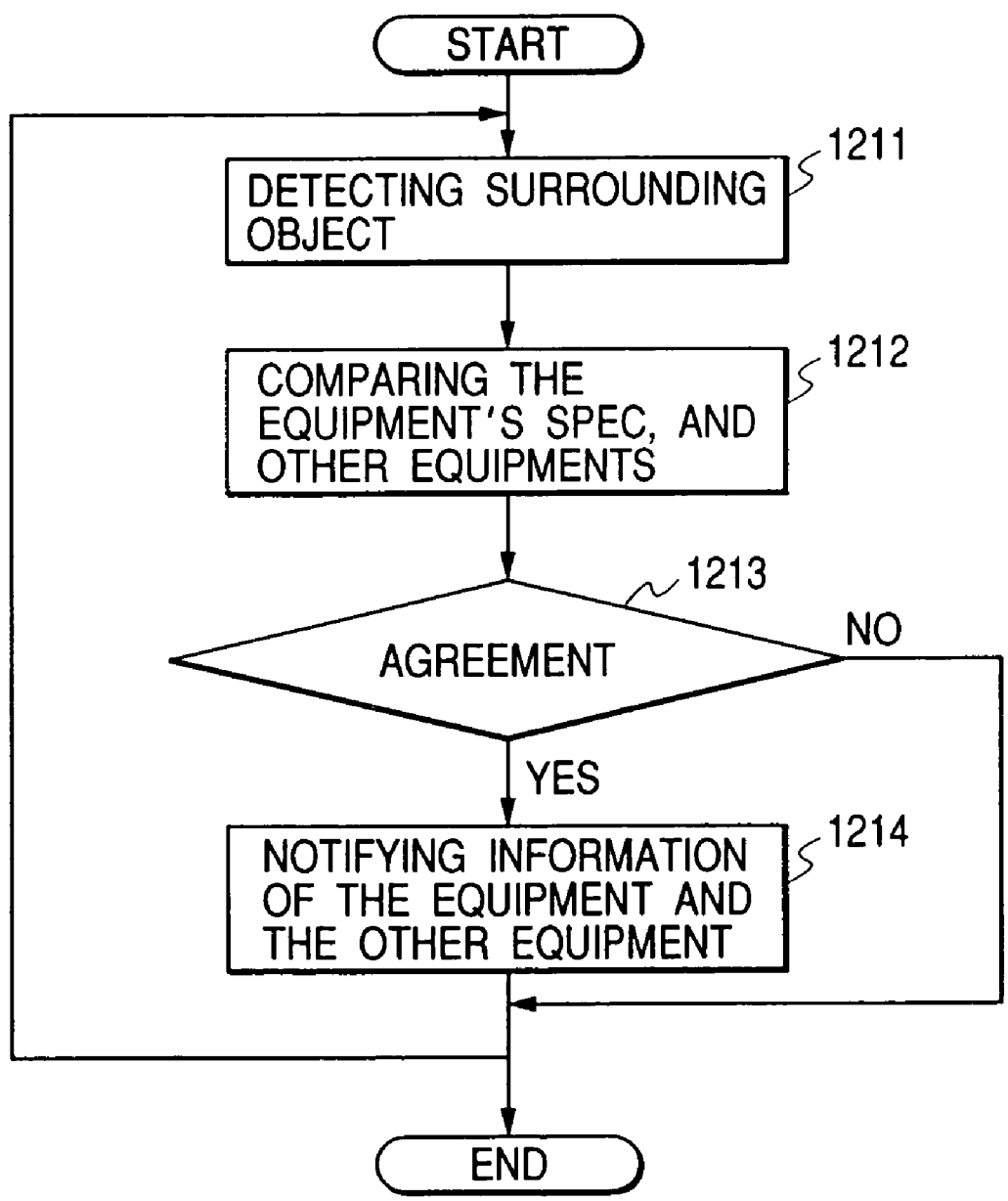

OBJECT SUBJECT TO PROCESSING, WHICH JUDGES NEED FOR PREDETERMINED PROCESSING THEREOF BASED ON USAGE AND SPECIFICATION THEREOF

BACKGROUND OF THE INVENTION

1. Field of the Invention

The present invention relates to a production system for producing products by processing and carrying objects, a distribution system for carrying and distributing objects, and/or a recycling system of production and distribution for recycling objects. The present invention relates to a system, more particularly to a recycling system and apparatus of production and distribution suitable for maintaining attributes, situation and/or processing or using results of objects and products to flexibly accommodate to the change in product configuration and production system configuration. The present invention is also related to objects subject to be produced, distributed and recycled, as well as the management apparatus and management sheets connected or attached to those objects.

2. Prior Art

There are known systems for managing the information about products together with the products. In such a system a data carrier is attached to a semi-manufacture during production to hold the information on the product ID or the process in the data carrier so as to be read out by apparatuses in the production process for processing the product. Similarly the read and write of the results of product inspection will be performed. The information stored in the data carrier is by the semi-manufacture of reference, read and write between the corresponding installations at the predetermined positions.

In accordance with the Prior Art as have been described above, the information stored is given by the installations or computer systems through a read-write device. Therefore, when the situation of semi-manufacture (interim products) is going to change, a separate management system will be required such as, for example, automated warehouse system for managing the storage locations, a management system for managing the processing and carrying deadline, and the like. The installation of such a mechanism requires a mechanism such as a network and software, in addition to the production facility. In a production system, since the displacement, extension and modification of production lines are often performed along with the diversification of consumer's needs in recent year, the modification is required when the system configuration is physically changed, therefore, there will be a difficulty in the achievement of flexible system.

SUMMARY OF THE INVENTION

The present invention has been made in view of the above circumstances and has an object to overcome the above problems and to provide a simplification of management by storing and updating the information in correspondence with the real thing (that is, object having the situation laid thereof considered). In addition, the present invention provides a flexibility of modification of production lines, distribution paths, and production procedures by mutually sharing the information locally managed in correspondence with the real things.

In accordance with the present invention, in order to achieve the foregoing objects the super deconcentrated production distribution recycling system and apparatus may comprise as follows.

Each object subject to be processed or used maintains its attribute information that is the information indicating the characteristics of the appropriate part or product about the object itself such as the specification and its situation information that is the information about the process and usage performed during the process on the appropriate part thereof indicating with respect to the situation of the process and usage, obtains the progress of process as well as the progress of usage from the object itself or another object subject to be processed or used in a similar way in accommodation with the change in the situation to update the situation thereof based on the information thus obtained, such that the information management may be allowed by having and updating in correspondence with the situation of real thing of the object.

Some exemplary aspects of the present invention may include a processing system for performing the processes such as production, distribution, and recycle, an object which is subject to be processed such as produced, a management apparatus (sheet) connectable to, attached to or included in the object. In the specification herein, an object is referred to as an object that is subject to be processed or used, unless otherwise specified. For example, the interim product, parts, materials, finished goods in the production facility, delivery goods in the distribution, object to be recycled, and the like may be included.

The situation information indicating the situation of processing and usage may included, for example, (1) the progress of processing of the interim product in the production process, schedule of processing, change in the schedule, the progress of processing of the interim product to be assembled together (already ready to assemble, or going to be ready to assemble by two hours, and the like), the failure of the interim product itself; (2) the progress of delivery of the goods to be delivered (for example, arrival to the distribution center, the progress of sorting in the distribution center, and the like), delivery schedule, change in the schedule; (3) an object has been expired (to be carried to a recycling facility), out of order (recommended to carry to the recycling facility), the extent of ablation (this will determine a recycling facility to be carried on, or whether recyclable or not).

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 3 shows an example of table configuration of memory in accordance with the first preferred embodiment of the present invention;

FIG. 12 shows a flow of situation determination process in the object situation recognition process in the fourth preferred embodiment of the present invention.

DETAILED DESCRIPTION OF THE PREFERRED EMBODIMENTS

A detailed description of one preferred embodiment embodying the present invention will now be given referring to the accompanying drawings. Following examples in particular will be used for the purpose of description with respect to the updating method of situation information of the object in the object side.

(1) stock yard and carrying management by distributing timer information to cause the object itself to update the processing and carrying deadline and waiting time.

(2) using results management and maintenance and recycling by updating the using results of object by the part itself or by the cooperation between parts.

Next, an example of cooperation of objects, (3) carrying management for performing the processing process and carrying in cooperation of the object together with another negotiable (AGV), parts check during carrying, free production lines (in a building, stepping over to another facility);

(4) support of processing and combination that may be unpredictable by checking information between objects.

Figure 1:
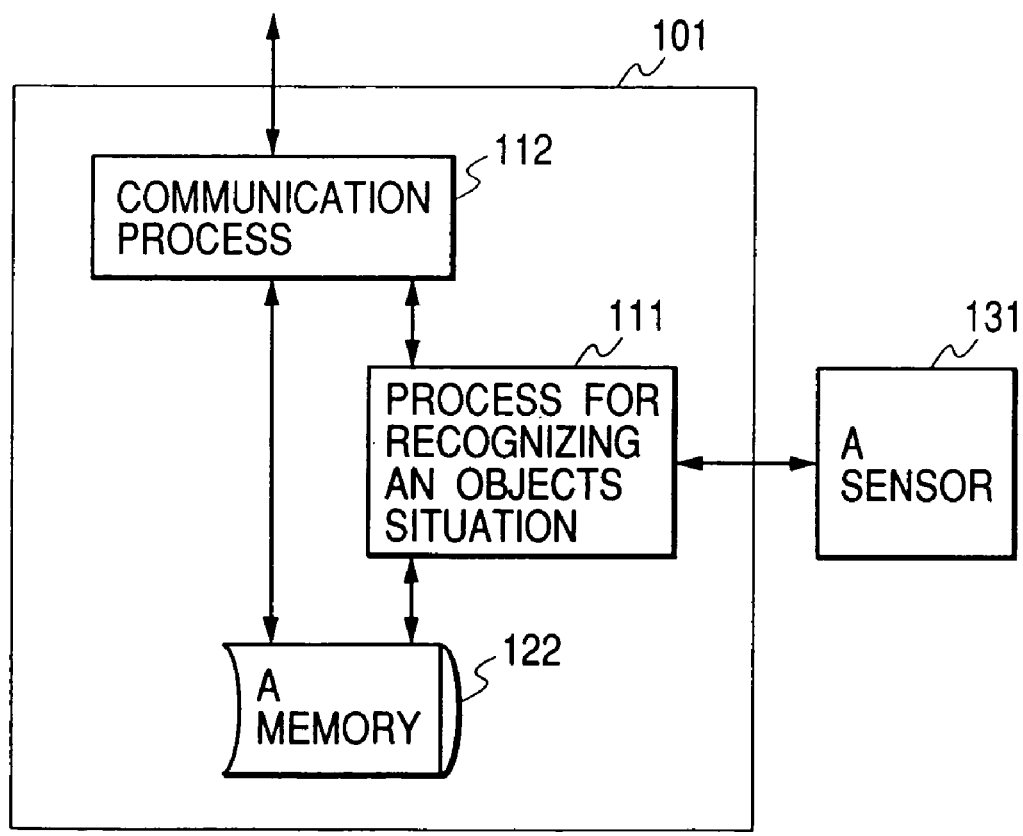
FIG. 1 shows an example of configuration of the apparatus in accordance with the present invention.

Now referring to FIG. 1, there is shown an example of configuration of the apparatus in accordance with the present invention. An apparatus 101 is constituted of a sensor 131, a process for recognizing an object's situation 111, a communication process 112, and a memory 122. The communication process 112 may communicate with another apparatus to read and write data of the memory 122. The process for recognizing an object's situation 111 is a process for obtaining the situation of an object connected through the sensor 131 the process result of which will be stored in the memory 122. Further, the process for recognizing an object's situation 111 has an interface to the communication process 112 for performing the communication with another apparatus.

Furthermore, the sensor 131 may be included in the apparatus 101. The apparatus 101 may be included in the object, or may be configured to attach to the object by using the printing technique.

EMBODIMENTS

First Embodiment

Figure 2:
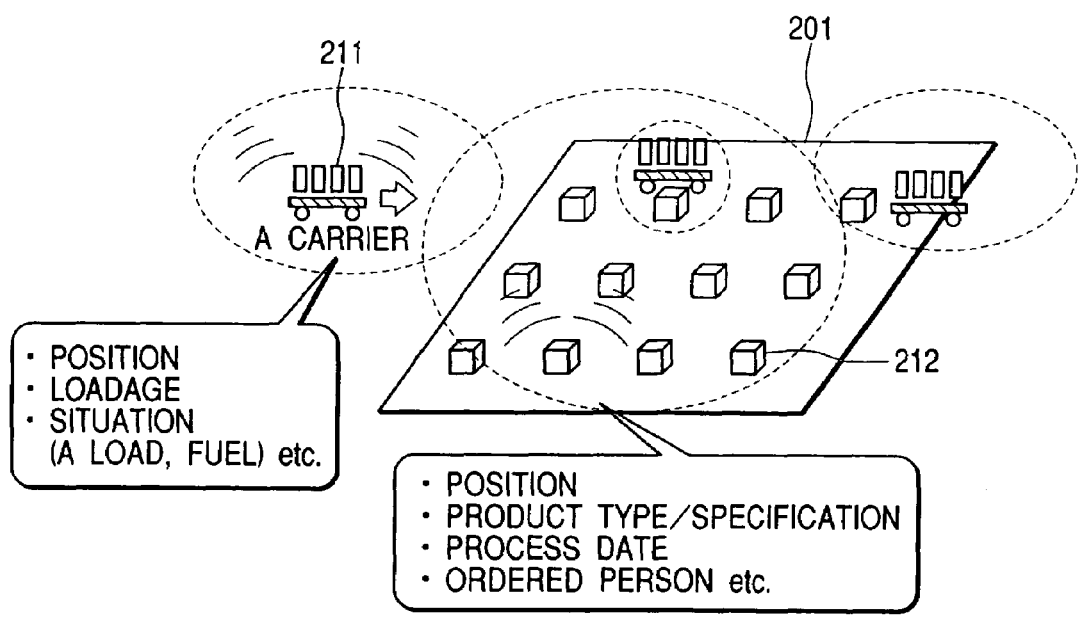
FIG. 2 shows an example of system configuration in accordance with a first preferred embodiment in accordance with the present invention.

Now referring to FIG. 2, there is shown an example of system configuration in accordance with a first preferred embodiment of the present invention. This system is a production system for producing goods, the interim product 212 correspond to the object. The interim product stockyard 201 is situated between the production processes for temporarily storing the interim products 212. The interim product 212 is carried in from the previous process by a carrier 211 and placed in the interim product stockyard, and similarly carried out to the subsequent process by a carrier 211. Here the apparatus in accordance with the present invention is each connected to an interim product 212 so as to store the information including the position of the interim product, product type/specification, process date, ordered person, etc. Here the apparatus 101 in accordance with the present invention may be included in the interim product 212 instead of being connected thereto. In a similar manner the carrier 211 may manage the position, the loadage, the situation of loadage, the situation of fuel in the carrier, etc. The interim product 212 after having processed in the prior process may not proceed to the next process for a given period of time in accordance with the specification thereof, for example until the agent paint will have been dried up.

It is required to process in the next process during a predetermined period of time in accordance with the respective specification thereof because excessive waiting of processing may cause chemical reaction. The process flow in this preferred embodiment will be described in greater details below. In the apparatus 101, whether the paint is dried or not will be determined from the time of painting and the present time. If it is determined that the paint has been dried and the process may be proceeded to the next step, the information indicating this will be transmitted to the production apparatus which performs the next process. Instead of transmitting directly to the production apparatus, the information on the process to be performed may be transmitted to the central management apparatus of the production system, which in turn may transmit to the production apparatus. Then the interim product 212 will have the process performed by that production apparatus. For example, it may be carried by the carrier 211 that is a production apparatus as a process. Alternatively, the determination of whether the paint is dried or not may be performed by a sensor instead of timing. The information on whether the paint has been dried or not may be communicated so as to proceed to next process when the paint of a predetermined number or more of interim products has been dried up.

The area required for the interim product stockyard 201 may be varied in accordance with the quantity of production, the layout may be varied in accordance with the product. With respect to such variation, by managing the product information on the side of interim products, flexible accommodation may be attained without having another separate management system or communication mechanism. That is, the interim product 212 may send and receive to and from other interim products the situation information indicating the progress of production. As a result, if the number of interim products having the painting process completed at a given moment is determined to be too much for the space in the interim product stock yard being provided because the painting process has been completed unexpectedly faster, the information indicating this situation will be sent to at least one of other apparatuses, or the central management apparatus, and the production apparatus. In such a case, if the situation information of another apparatus (which is relatively irrelevant in particular to the painting process) indicates that there are spaces elsewhere for performing the interim products, an instruction will be given to at least one of other apparatuses, the central management apparatus, and the production apparatus so as to use the spaces as the stock yard of interim products having the painting process completed. Then, the spaces also will be made use of the stockyard of interim products having the painting process completed.

In addition, the interim products already placed in the interim product stockyard may be displaced to another place. At this time, the apparatus for giving the instructions may be restricted to the apparatuses corresponding to (being included in, being connected to) the interim products having the painting process completed, certain predetermined apparatuses among them (ones that has been specifically predefined at the time of beginning of production, that has the painting process completed at last when determining that the spaces is going to be shorten, that has completed at first). This may reduce the communication traffic. In addition, by designating the apparatus that has been specifically predefined at the time of beginning of production to the predetermined apparatus, if the interim product corresponding to this apparatus is departed out of the production line (determined to be defective, or completed to assemble and the like), a configuration may be allowed to transmit information indicating that the privilege of instructing other apparatuses may be alienated.

As have been described above, in the preferred embodiment, each apparatus 101 may use the sensor 131 and the like to inform other apparatuses of the situation information of the corresponding interim product 212 (object). This notice may be transmitted on the occasion of at least one of (needless to say a combination of) events when the situation changes, when a predetermined period of time elapsed, when requested from another apparatus or the production apparatus, the central management apparatus of the system, and the like.

FIG. 3 shows an example of table configuration of memory of the apparatus connected to an interim product in accordance with the present invention. Each record is configured by a pair of record identifier and a value so as to facilitate the addition and deletion of items. In the record 311 the identifier of a product being connected is stored. In the record 312 the position placed in the interim product stockyard is stored. in the record 313 the product specification is stored and is used for the processing condition. In the record 314, the ordered person is stored, and in the record 315 the date of delivery is stored.

In the record 316 the process date is stored, and the date processed in the previous process is stored. In the record 317 the processing deadline is stored, the minimum shortest period of time and the maximum longest period of time after the previous process in order to process in the subsequent process is stored. Here the records 311, 313-316 are set before the previous process for using the control in the carrying and in the subsequent process. The record 312 may be either set by the carrier or may install a position detecting apparatus such as a GPS (global positioning system) in the apparatus itself, and may be stored by detecting the position by the apparatus itself. The record 317 is updated by the apparatus itself in correspondence with the change in the situation of the interim product such as the product specification and the process contents in the previous process.

Figure 4:
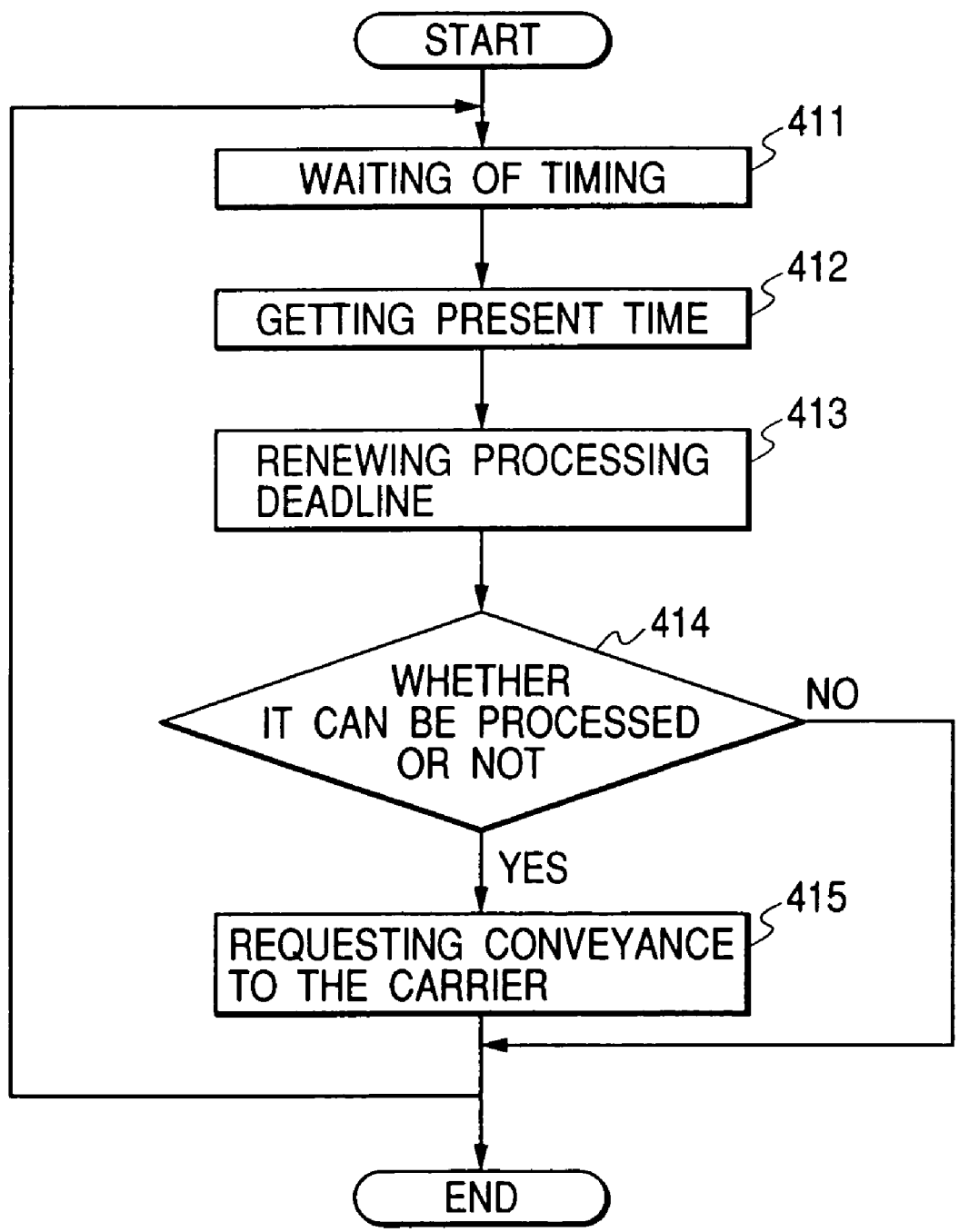
FIG. 4 shows a flow of situation update process in the object situation recognition process in the first preferred embodiment of the present invention.

FIG. 4 shows a flow of situation update process in the object situation recognition process in the first preferred embodiment. In the present embodiment, as the processing situation of each of interim products, the update process of either the situation capable of process deadline in the subsequent process or the situation of waiting in the interim product stockyard will be described below. In this process, by waiting of timing of situation renewing (step 411), getting the present time when the timing of processing is arrived (step 412). At this point for the detection of timing, the present time may be sent by a given cycle to the interim products by the communication process from the outside, or may be detected by adding a timer function to the apparatus itself that is connected to an interim product. Then thus got present time, the process date 316 in the previous process, and the processing deadline 137 are used for renewing the present situation of the process deadline (step 413). At this point, whether it can be processed or not is determined (step 414), if it can be then requesting conveyance to the carrier is issued (step 415).

The requesting conveyance may be issued by requesting by communicating one-by-one to the carrier when the carrier has been determined beforehand, or may be issued by requesting by the multicast method when not determined to allow a suitable carrier to be selected. Scheduling may be performed such as by transmitting by adding the processing deadline in the subsequent process to the requesting conveyance to carry the interim product that is restricted by the deadline in the carrier side or the central management apparatus.

In accordance with the method of the present embodiment, the processing and carrying control corresponding to the specification of each of products and to the situation may be performed without using a supervising mechanism or instructing mechanism other than the object. Accordingly, with respect to the change in the disposition, the size and the like of the interim products stockyard or the change of the product type and the mixed production, it can be accommodated by each product unit, so that it can be accommodated flexibly. In accordance with the quantity of production and the degree of emergency, it is possible to flexibly dispatch the carriers to each of processes, so that the limited resource may be used efficiently. In addition, by having the determination processing mechanism of the processing deadline and the mechanism for transmitting the processing request in each interim product side, interim products that can be processed and carrier that can carry may together perform the process in the asynchronous cooperation without synchronizing the entire system, so that the throughput of the entire system may be improved when there is a number of interim products or carriers.

Second Embodiment

In the second preferred embodiment of the present invention, an example of updating the situation of objects by the cooperation among apparatuses installed connected to an object or included in the object will be described.

Figures 5, 6:
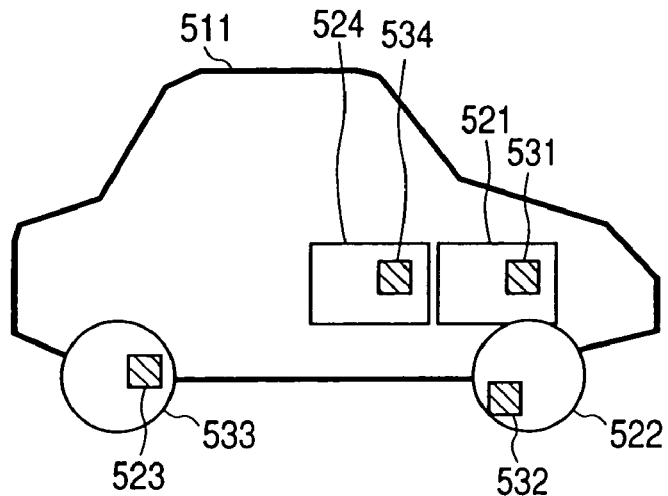
FIG. 5 shows an example of system configuration in accordance with a second preferred embodiment of the present invention.
FIG. 6 shows an example of table configuration of memory in accordance with the second preferred embodiment of the present invention.

FIG. 5 shows an example of system configuration in accordance with second preferred embodiment of the present invention. An automobile 411 is formed of a large number of parts. A decoder 521 is a machine that records the number of revolution of wheel, and that mounts the apparatus 531 in accordance with the present invention. A tire 522, and a tire 523 mount an apparatus 532 and 533 in accordance with the present invention, respectively. Similarly, an accelerometer 524 also mounts the apparatus 534 in accordance with the present invention. Here the tires 522, 523 require some maintenances and replaces in correspondence with the using condition such as the traveling distance. In addition there may be replacements, the period of use of the body of automobile is not necessarily matched with the period of use of tires.

FIG. 6 shows an example of table configuration of memory of the apparatuses 532, 533 in accordance with the present embodiment. In a record 611 the product identifier is stored. In the record 612 the product specification is stored, in which the information such as the relationship between the usage condition of the product such as the acceleration and deceleration and the endurance traveling distance, the material at the time of production, and the history of processing is stored. In the record 613 the using distance, the information with respect to the traveling distance that is converted by adding the usage condition, based on the information from other apparatuses is stored. In the record 614 the traveling distance of the automobile at the time of renewing the using distance is stored.

Figure 7:
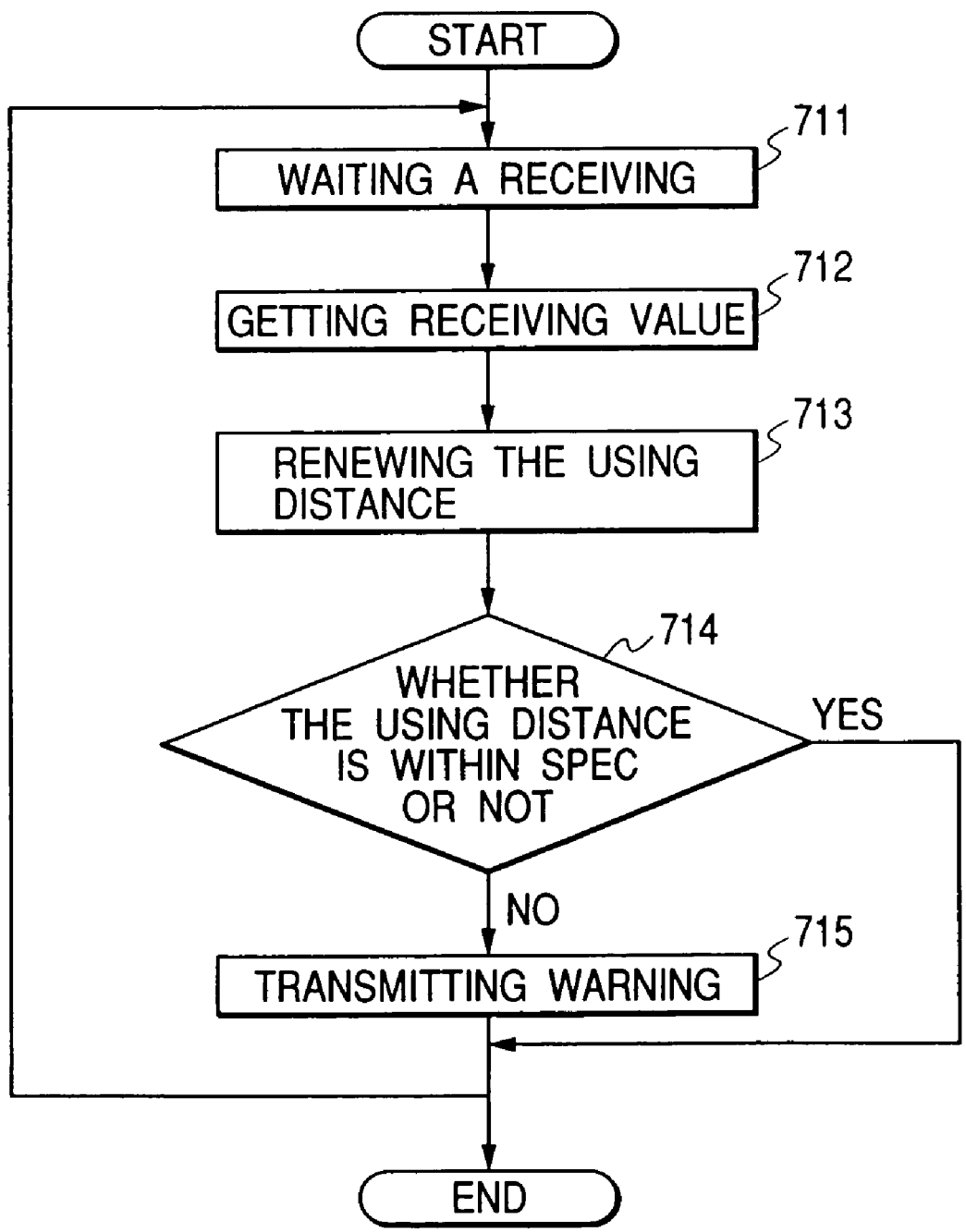
FIG. 7 shows a flow of situation update process in the object situation recognition process in the second preferred embodiment of the present invention.

FIG. 7 shows a flow of situation update process in the object situation recognition process of the apparatuses 532, 533 in accordance with the present embodiment. From other apparatuses, the information on the automobile is broadcasted as a pair with the identifier by using a wireless communication, the present apparatus is waiting a receiving (step 711), and getting receiving value (step 712). In this example, the information with respect to the traveling distance is transmitted from the decoder 521, and the information with respect to the acceleration and deceleration is transmitted from the accelerometer 524, the information is obtained. Thereafter, on the basis of the using condition having received and the value of traveling distance, from the difference from the traveling distance 614 at the time of renewing in the last time, renewing the using distance (step 713), whether the using distance is within specification or not is determined in comparison with the product specification 612 (step 714). When the service life has been exceeded, transmitting warning to other apparatuses (step 715), prompts the tire replacement. Instead of whether the service life has been exceeded or not, it may be possible to determine whether serviceable or not by the sensor.

Figure 8:
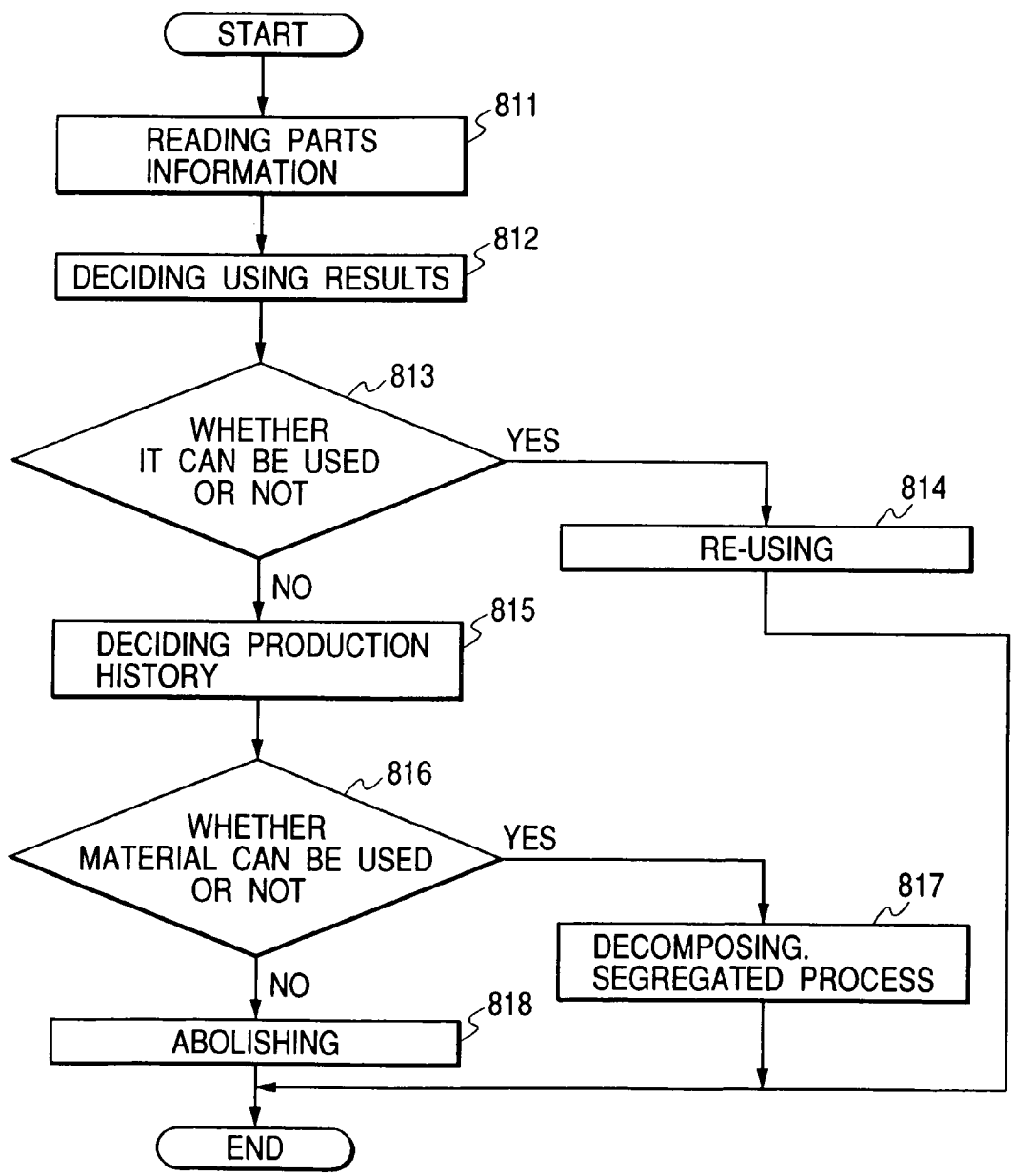
FIG. 8 shows a flow of processing of recycling devices in accordance with the second preferred embodiment of the present invention.

FIG. 8 shows a flow of processing of recycling devices in accordance with the present embodiment. In the present process, reading a parts information (step 811) and determining using results (step 812) are performed. Here, it is determined whether the using results is within the service condition on the specification, whether it can be used or not in accordance with the rule at the time of recycle (step 813). When it can be used, re-using process is performed (step 814). When re-using as a product is not possible, by determining production history, such as used materials and production condition (step 815), and whether material can be used or not based on the technology at the time of recycling (step 816), decomposing segregated process will be performed (step 817). If a material cannot be used, abolishing will be performed (step 818).

Like this, even when a tire is replaced before exceeding the service life, the degree of ablation can be measured from the memorized using distance, so that it can be of service to the quality diagnosis at the time of recycle. For the determination of product specification at the time of recycle, without installing another information management mechanism corresponding to the life cycle of products or performing the maintenance of the management information by tracking the life cycle, maintenance and recycle process may be performed corresponding to the actual products.

In addition, although in the present embodiment an example using by receiving the information with respect to the traveling distance from the decoder 521 has been described, for example a sensor embedded in a tire may exchange radio wave with a sensor in the body side to use the physical information such as the surface thickness converted from the permeability of the radio wave to allow to convert the using results. Alternatively, a dedicated machine installed in a specific place such as a gas station and garage may transmit to the tire by obtaining the traveling distance from the automobile, or the dedicated machine may obtain the specification from the tire to determine whether to be within the serviceable distance or not.

In accordance with the present embodiment, the apparatus either connected to or included in each object shares the situation of each one to locally determine the condition in order to thoroughly perform the management flexible and suitable for each of objects, even in an environment where the objects are often recombined.

Third Embodiment

In third embodiment in accordance with the present invention, an example will be described below in which an object and cooperates with the type of environmental surrounding object in accordance with such situations as the processing stage on the processing procedure and the allowed and denied processing.

Figure 9:
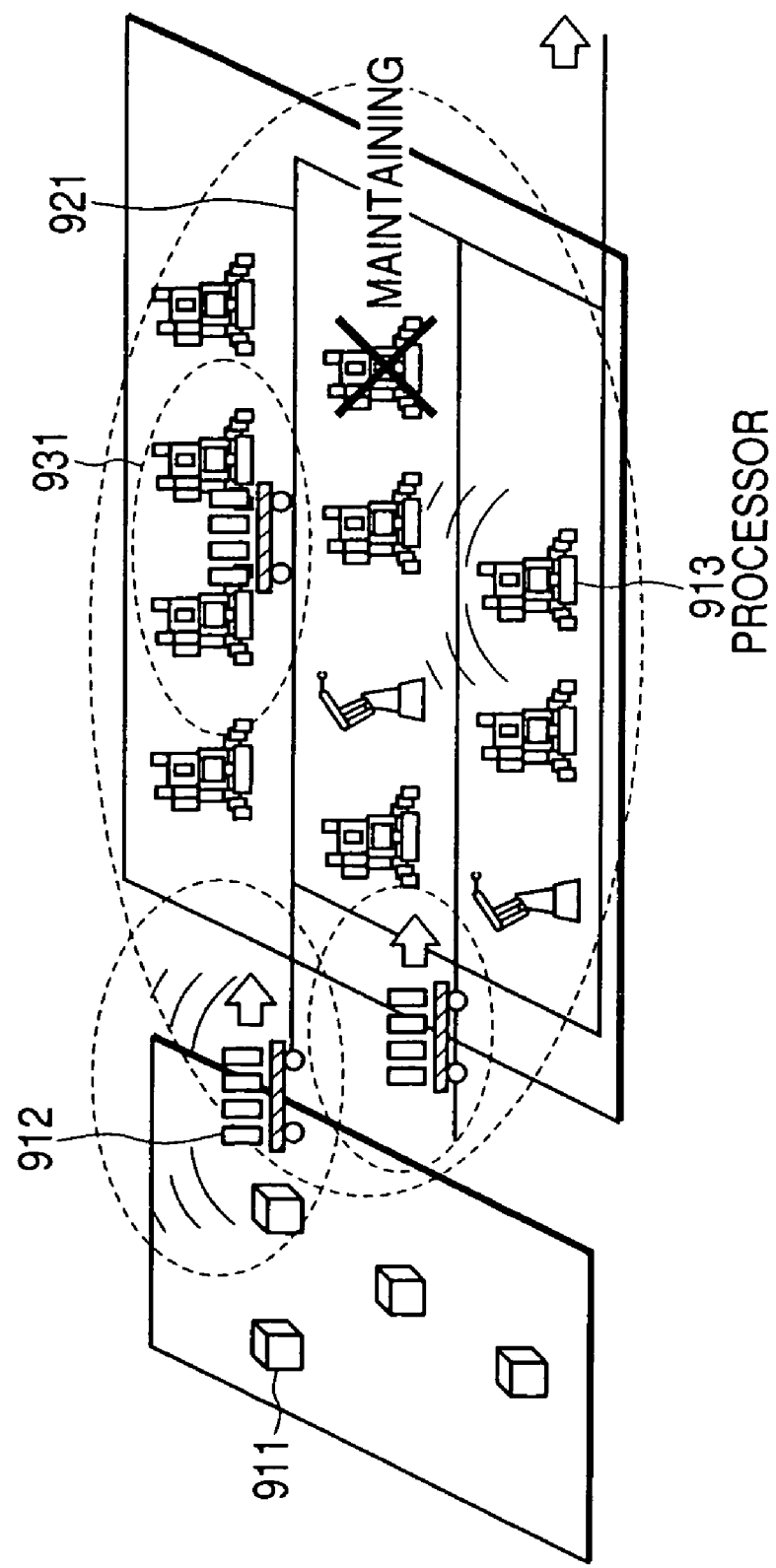
FIG. 9 shows an example of system configuration in accordance with a third preferred embodiment of the present invention.

FIG. 9 shows an example of system configuration in accordance with third preferred embodiment of the present invention. The interim product 911 is carried by a carrier 912 from the interim product stockyard. The carrier moves on the carrier line 921 to carry one or a plurality of interim products to a processor 913 to which the apparatus in accordance with the present invention is connected so as to perform the processing and to carry the products. At this point there are many type of processors, which produce products by driving a variety of processors to perform the process in the course of carrying. The interim product performs the communication with the processors in a predetermined range as shown by 931 by using the wireless communication. The number, the sequence, the type of processor to ask to process into the product may differ from type to type of each diverse product. Also, the processors have a variety of condition situation such as in operation, out of order for the maintenance, in emergency stop due to anomaly and the like. The apparatus in accordance with the present invention may be included instead of being connected to the interim product 911 or processor 913.

Furthermore, although the present embodiment will be described by way of example a production line in a facility, the method in accordance with the present embodiment is also effective even when the detailed management of information of each device and production lodgment is difficult such as the case of performing the production in a vast range such as the case of performing the product processing and assembly in the distribution stage.

Figure 11:
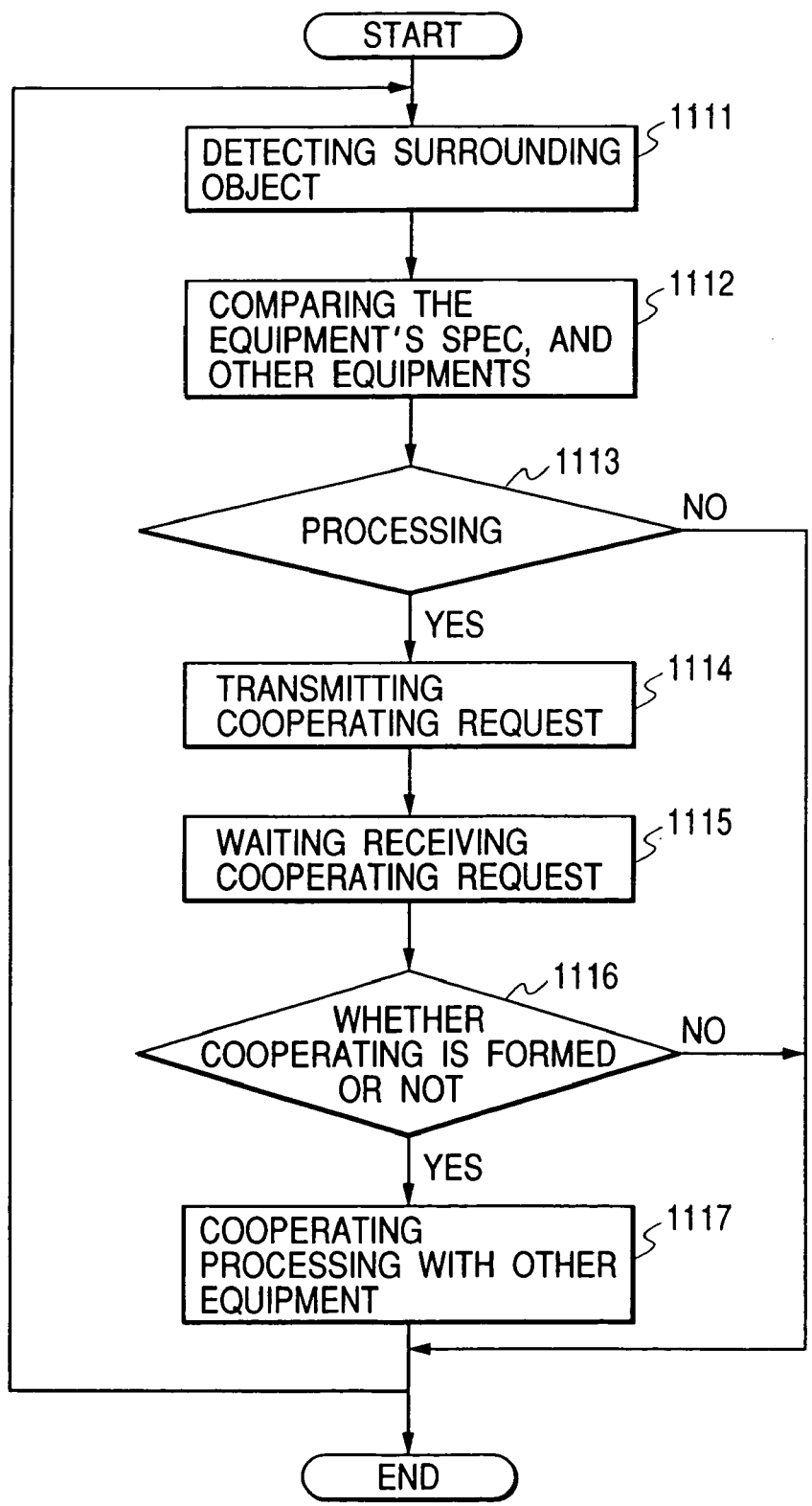
FIG. 11 shows a flow of situation determination process in the object situation recognition process in the third preferred embodiment of the present invention.

FIG. 11 shows a flow of situation determination process in the object situation recognition process in the present embodiment. In the present process, detecting surrounding object is performed through a communication process (step 1111). For detecting surrounding object, detection may be allowed for example by periodically broadcasting message data in which the information on the apparatus is recorded from each apparatus and receiving this. After detecting surrounding object, comparing the equipment specification and other equipment is performed (step 1112). In case of the interim product 911, for example the other is a processor, and by obtaining the specification of the processor it is determined whether the processor can perform the processing subsequently in the processing procedure of itself stored in the memory 122. The determination of processing deadline of the interim product itself also is performed to determine whether processing is allowed or not. In case of the processor 913, the other is an interim product 911, whether processing is allowed or not is determined by obtaining the specification of the interim product to collate the specification of itself with the situation. It is determined including whether itself can process at present, that is another product is not in processing, or is in a situation incapable of processing such as during maintenance.

Whether processing is allowed or not is determined like this (step 1113), if the result is yes, then transmitting cooperating request message to the other equipment (step 1114) for waiting receiving cooperating request (step 1115). Whether cooperating is formed or not is determined based on whether receiving or not (step 1116), if receiving is not present for a predetermined period of time then the cooperating is determined not to be formed to return to step 1111. If receiving is present and cooperating is formed then cooperating processing with other equipment is performed (step 1117). In case of an interim product 911, an instruction to the carrier is issued to move in front of the other processor to perform processing to update the processing step that is the situation of interim product, namely the step of completed processing in the result of the processing procedure. In case of the processor 913, the specification stored in the interim product is read to perform the processing in accordance with the specification.

In cases in which the detected object is not the other subject to process or the cooperating is not formed, the carrier will move on the carrier line.

In accordance with the present embodiment, if there are a number of objects such as interim products and processors, or if the processor or processing procedure capable of processing is different because the specification is different for each interim product, or even when the processing is different in accordance with the situation of interim products or processors, it is possible to flexibly perform the production without installing a complex scheduling or large scaled management mechanism. It is possible to flexibly accommodate to the change in the number of interim products and the number and type of processors.

Fourth Embodiment

In fourth preferred embodiment of the present invention, by comparing information between objects an example for accommodating to the processing and combination that can be unpredictable will be described.

Figure 10:
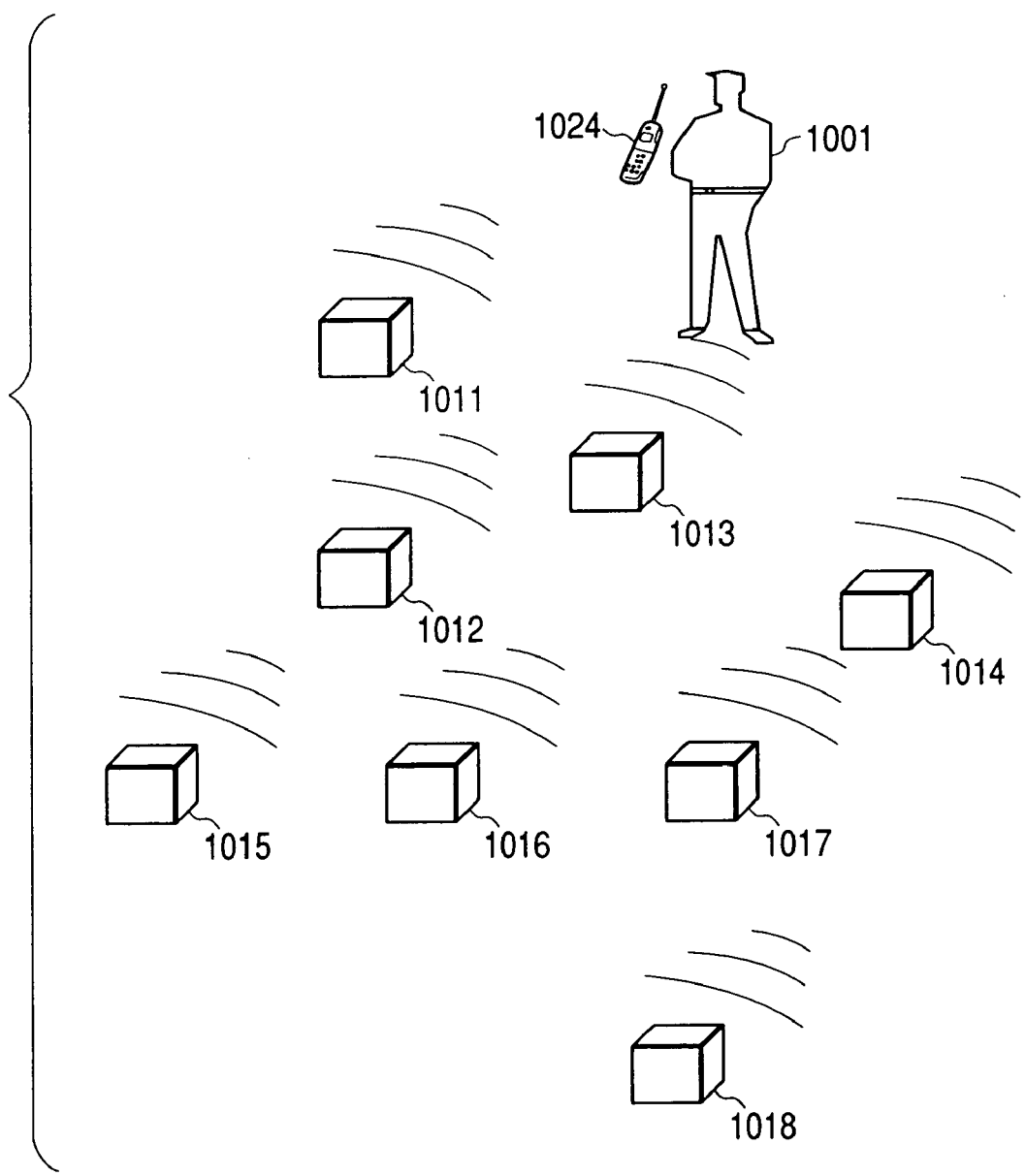
FIG. 10 shows an example of system configuration in accordance with a fourth preferred embodiment of the present invention.

FIG. 10 shows an example of system configuration in accordance with fourth preferred embodiment of the present invention. To products 1011-1018 and the component parts thereof the apparatus in accordance with the present invention is connected to manage the product or parts information. For example, the product 1011 is a personal computer, the product 1012 is an external storage, and the product 1013 is a video deck. The apparatus in accordance with the present invention may be allowed so as to be included in the products 1011-1018. The information may, in addition to being shared among products, allow a human 1001 to refer and update by using a terminal 1024. To the product 1011 and the product 1013 internal storage equipment is installed, may be exchanged each to another if the specification is matched. The product 1012 is possible to connect to the product 1011 or the product 1013 if the specification is matched.

FIG. 11 shows a flow of situation determination process in the object situation recognition process in the present embodiment. In the present processing, each product or part detects surrounding object (step 1211). To detect, as have been described in the fifth preferred embodiment, a method may be used for periodically transmitting message data from each object, or may scan surrounding object. Objects are approximated each to another to the detectable distance, other object is detected in step 1211. After detecting other object, the specification of the other object is obtained for comparing the equipment's specification (step 1212). At this point, for each part such as CPU and memory in a personal computer, the specification is exchanged with such parts as the motor and memory in the video deck. Or at the product level the external storage equipment discloses the specification including the interface information to share the specification including the interface information of the personal computer and video deck.

Thereafter by comparing the equipment's specification and other equipment (step 1213), if agreement is achieved then notifying the information of equipment and the information of other equipment is performed (step 1214). The notifying information here allows a human to confirm by receiving at the terminal 1024 that the human 1001 possesses.

In accordance with the present embodiment, it can be determined whether products or parts may be combined or exchanged each with other without either inspecting the specification of product or decomposing or attempting a combination. When remodeling after the purchase of product, or even when diverting to parts of another product at the time of failure of parts, confirmation is possible without error before attempting. In addition, when the specification of products is diverted for each product or the specification as the whole product is changed by reconstruction or recycling in the course of product using, whether a combination is possible or not may be confirmed without error.

Furthermore, in accordance with the present invention, the processing is the production of products, the object is an interim product of the product, and as the situation information, including at least one of the progress of processing of the interim product in the production process, the processing deadline, the processing due, the due change, the progress of processing of other interim product to be assembled together, the failure of the interim product is included.

The processing is a delivery, the object is a delivery goods to be delivered, as the situation information, including at least one of the progress of the delivery, the delivery deadline, the delivery due, and the change of the delivery due is included.

As the situation information, at least one of whether the using deadline of the object is reached or not, the object is unusable or not, the degree of ablation of the project is included, as the processing, giving warning on whether usable or not in accordance with the situation information is also included.

The processing is a recycling processing, as the situation information, at least one of whether the using deadline of the object is reached or not, whether the object is unusable or not, and the degree of ablation of the project is included.

As the progress of processing, changing the due of the processing is included. Further, as the change of due of processing, the change of displacement of the object is included.

What is claimed is:

1. An object subject system including a plurality of objects subject to be processed, wherein:

each of the objects subject to be processed is provided with an object body to be processed and a device including a processing unit, a storage unit, and a communication unit;

said storage unit for each of said objects subject to be processed is arranged to store an identifier of said object with which the storage unit is provided, a product specification including a service condition of said object, and a usage situation of said object;

said processing unit for each of said objects subject to be processed renews said usage situation of said object in said storage unit provided therewith on the basis of the identifier of said object and a usage situation of said object received from other objects subject to be processed, determines whether or not said renewed usage situation is within a predetermined service condition of said product specification stored in said storage unit, and outputs a request for predetermined processing for another object subject to be processed when said processing unit judges that the predetermined processing is required for said object, wherein:

said other objects subject to be processed include an accelerometer and a decoder for recording a number of rotations of said object;

said product specification stored in said storage unit includes a relation between usage conditions of said object including either acceleration or deceleration and an endurance distance of said object;

said usage situation stored in said storage unit includes a traveling distance of said object converted on the basis of the usage conditions of said object;

said usage situation received from said other objects subject to be processed includes a traveling distance of said object received from said decoder and usage conditions of said object received from said accelerometer; and said processing unit renews a using distance of said object stored in said storage unit on the basis of a traveling distance of said object received from said decoder and a usage condition of said object received from said accelerometer, determines whether or not the renewed using distance of said object is within a range of an endurance distance converted on the basis of a relation between the usage condition of said object stored in said storage unit and the endurance distance of said object, and outputs a warning for conversion of said object to said other objects subject to be processed when the using distance of said object is not within the range of said endurance distance.

2. The object system according to claim 1, wherein:
said object is a tire provided with a sensor;
said processing unit converts information from said sensor into a surface thickness of said tire; and
said processing unit applies the surface thickness of said tire in place of a traveling distance of said tire received from said decoder.

3. The object system according to claim 2, wherein:
said processing unit applies information from said sensor in place of the usage situation of said object subject to be processed received from said other objects subject to be processed.

4. The object system, according to claim 1, wherein,
said processing unit applies a traveling distance of said object received from a measuring unit installed outside a vehicle where said object is fixed in place of a traveling distance of said object received from said decoder.

5. The object system, according to claim 1, wherein:
said object subject to be processed and said other objects subject to be processed are vehicle component parts.

6. The object system according to claim 1, wherein
said object subject to be processed and said other objects subject to be processed are hardware.

7. The object system according to claim 1, wherein:
said other objects subject to be processed are provided with a device including a processing unit, a storage unit, and a communication unit; and
said device of each of said other objects subject to be processed is arranged to transmit and receive a usage situation between itself and each other of said devices of said other objects subject to be processed.

8. The object system according to claim 1, wherein:
said updated usage situation of said object to be processed is used for discriminating an available or unavailable state of recycling of said object subject to be processed.

9. The object system according to claim 1, wherein:
said predetermined processing of each of said devices is to maintain or replace the object to be processed.

10. The object system according to claim 1, wherein:
said device is a data carrier device mounted on each of said objects.

11. A processing method for objects subject to be processed, said objects each being provided with an object body to be processed and a device including a processing unit, a storage unit, and a communication unit, comprising the steps of:

storing in said storage unit, an identifier of said object subject to be processed with which the storage unit is provided, the product specification of said object, and a usage situation of said object;

renewing, by said processing unit, said usage situation of said object in said storage unit provided therewith on the basis of the identifier of said object and a usage situation of said object received from other objects subject to be processed;

determining, by said processing unit, whether or not said renewed usage situation is within a predetermined service condition of said product specification stored in said storage, unit, and outputting, by said processing unit, a request for predetermined processing for another object to be processed when said processing unit judges that the predetermined processing is required for said object, wherein:

said other objects subject to be processed include a decoder for recording the number of rotation of said object and an accelerometer;

said product specification stored in said storage unit includes a relation between usage conditions of said object including either acceleration or deceleration and an endurance distance of said object;

said usage situation stored in said storage unit includes a traveling distance of said object converted on the basis of the usage condition of said object;

said usage situation received from said other objects subject to be processed includes a traveling distance of said object received from said decoder and usage conditions of said object received from said accelerometer;

said processing unit renews a using distance of said object in said storage unit on the basis of a traveling distance of said object received from said decoder and usage conditions of said object received from said accelerometer;

said processing unit determines whether or not the updated using distance of said object is within a range of endurance distance converted on the basis of a relation between the usage conditions of said object stored in said storage unit and the endurance distance of said object; and said processing unit outputs a warning for conversion of said object to said other objects subject to be processed when the using distance of said object is not within the range of said endurance distance.

12. The processing method according to claim 11, wherein:
each of said objects broadcasts said usage situation of its own object to a plurality of other objects.

13. The processing method according to claim 11, wherein:
each of said devices is a data carrier device mounted on a corresponding one of said objects.

* * * * *